United States Patent [19]
Johnson et al.

[11] 3,873,062
[45] Mar. 25, 1975

[54] AIR HOSE QUICK COUPLER

[76] Inventors: Jerry Lynn Johnson, P.O. Box 50, Potrero, Calif. 92063; Donald L. Adams, c/o Diamond-U Products, Inc., 1427 Magnolia St., Long Beach, Calif. 90813

[22] Filed: Nov. 30, 1973

[21] Appl. No.: 420,526

[52] U.S. Cl. .............................. 251/149.6, 285/317
[51] Int. Cl. ............................................. F16l 37/18
[58] Field of Search ......... 251/149.6; 285/315, 316, 285/317, 319, 321, 322, 323, 324

[56] References Cited
UNITED STATES PATENTS

| | | | |
|---|---|---|---|
| 1,599,998 | 9/1926 | Heck | 285/315 X |
| 2,327,611 | 8/1943 | Scheiwer | 251/149.6 |
| 2,952,482 | 9/1960 | Torres | 285/320 X |
| 3,028,179 | 4/1962 | Abramoska | 285/320 X |
| 3,628,812 | 12/1971 | Larralde et al. | 285/322 X |
| 3,684,321 | 8/1972 | Hundhausen et al. | 285/319 X |

*Primary Examiner*—William R. Cline
*Attorney, Agent, or Firm*—Pastoriza & Kelly

[57] ABSTRACT

A hollow cylindrical body has an inlet end for connection to an air hose and an outlet end for connection to an air-driven tool. The cylindrical body serves as a quick coupler from the source of air supply to the tool and includes an internal valve seat and poppet-type valve head. A retainer member in the form of a ring surrounds the body and includes flexible fingers extending forwardly and radially inwardly to engage an enlarged diameter portion on the male connecting member from the air-driven tool to lock the member within the cylindrical body. The nose of the male member pushes the poppet valve away from the seat and simultaneously seals against the valve seat within the cylindrical body. A sleeve surrounds the retainer member and is slidable in a rearward direction to release the flexible fingers when it is desired to quickly disconnect the male connector. The cylindrical body and retainer member are made of plastic material and dimensioned such that the coupling device can receive several different configurations of male connectors.

6 Claims, 5 Drawing Figures

PATENTED MAR 25 1975　　3,873,062

AIR HOSE QUICK COUPLER

This invention relates to coupling devices and more prticularly to an air hose quick coupling device for connecting a source of air to an air-driven tool.

BACKGROUND OF THE INVENTION

Quick couplers for hose lines are well known in the art and in wide use at the present time. Typically, the present day couplers are formed of metal such as steel or brass and take the form of a cylindrical body connected to a source of air and arranged to receive a male connector from an air driven tool. The male plug or connector is fairly standard although there are different types. Most of the male connectors include a cylindrical nose portion with an enlarged diameter central portion for cooperation with the quick connect devices available. Thus, when the male connector is inserted in the cylindrical body, there are provided retaining means engaging about the enlarged diameter portion to hold the male member in its connected position. The arrangement is such that the male connector can be manually inserted or removed in a fairly quick manner without having to thread parts together.

Most of the presently available quick coupling devices differ essentially only in the type of retaining means for holding the male connector in position. For example, in one type of device, a radial row of ball bearings is retained in a detent by a spring loaded sleeve which holds the balls in place. Pulling back on the sleeve releases the balls sufficiently to release the male connector plug. In another system, retaining of the male connector plug is accomplished by a pair of rollers held by a retaining ring and again a spring loaded sleeve is used to retain the rollers in the male connecting plug behind the enlarged diameter portion. Pulling back on the sleeve permits the rollers to retract so that the male plug can be disconnected. A third method of retention is simply a lug or pin which is mounted on the receiving cylindrical body so that it can slip into a suitably shaped slot and when rotated a few degrees cannot be disconnected.

A serious difficulty that is common to all of the foregoing presently available types of quick connect devices is the fact that they are non-interchangeable; that is, different types of male connectors require different types of quick connect devices. Moreover, the various available couplers as have been described are made of metal which is not only expensive but subject to corrosion, particularly in salt-air environments.

BRIEF DESCRIPTION OF THE PRESENT INVENTION

With the foregoing in mind, the present invention contemplates a vastly improved air hose quick coupling device utilizing a unique retaining means which not only assures securement of a male connector in the device but renders the device adaptable to various different types of male connectors. In other words, even though certain dimensional characteristics of the male members may vary, they may all be accommodated by the single quick connect device of this invention. In addition, the device of the present invention is fabricatd from molded plastic parts which reduces substantially the expense as compared to presently available devices and in addition avoids the problems of corrosion. A further advantage of plastic is the fact that different devices may be color-coded.

Briefly, the coupling device comprises a molded plastic cylindrical body having an internal valve seat and poppet valve head spring biased against the seat. A retainer member takes the form of a ring surrounding the body and a plurality of flexible fingers extending forwardly and radially inwardly from circumferentially spaced points on the ring. The cylindrical body itself includes side openings. A retainer spring urges the retainer member forwardly along the body so that the end portions of the fingers pass through the side openings for engaging about the enlarged diameter portion of a male connector. An important feature resides in the provision of small exterior steps on the ends of the retainer member fingers which seat under the forward edges of the side openings when the male member is fully inserted to positively lock the member in place. In addition, the dimensioning is such that different types of male members having different dimensions can be accommodated in the single quick connect structure.

BRIEF DESCRIPTION OF THE DRAWINGS

A better understanding of the invention will be had by now referring to the accompanying drawings in which.

DETAILED DESCRIPTION OF THE PREFERRED EMBODIMENT

Figure 1:
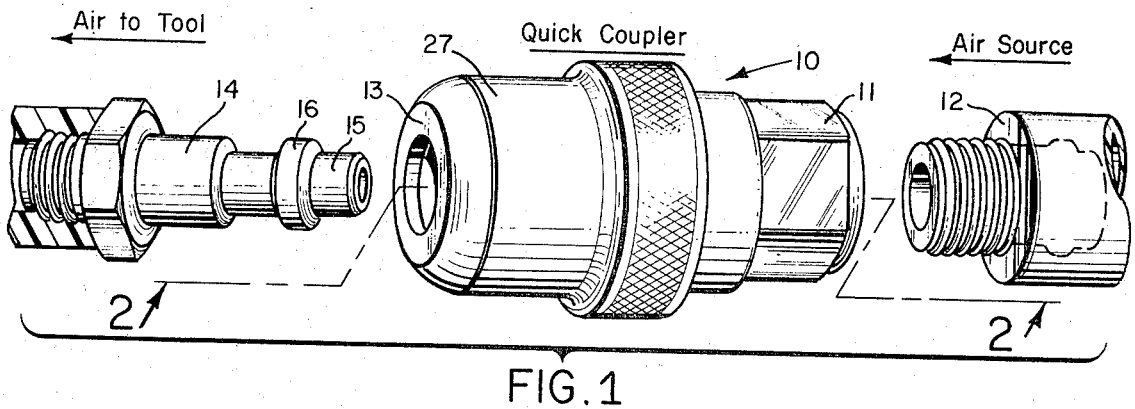
FIG. 1 is an exploded, perspective view showing the quick coupler device in position to be connected to an air source hose and to receive in a quick coupling manner the male connector from an air-driven tool.

Referring first to FIG. 1 the air hose quick coupler is designated generally by the numeral 10 and includes an inlet end 11 arranged to be connected to an air hose 12 connected to a source of air. The outlet end of the coupler 10 terminates in an end cap 13 and is arranged to receive a male connector 14 which in turn connects to, for example, an air-driven tool. Most male connectors for the air-driven tools are of generally the same configuration although they may differ in dimensions and, as described, the presently available quick couplers can normally only accommodate a specifically dimensioned male connector. This particular restriction, as will become clearer as the description proceeds, is overcome by the quick coupler 10 of the present invention.

As shown in FIG. 1, the male connector 14 includes a cylindrical nose portion 15 having a central enlarged diameter portion 16.

Figures 2, 3:
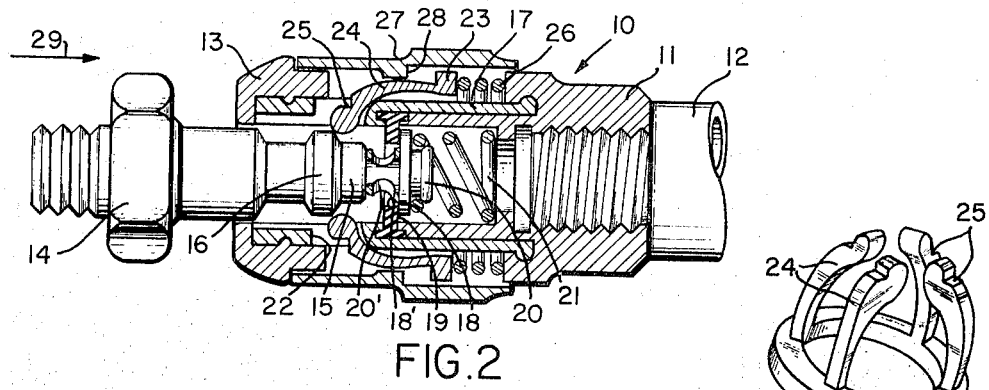
FIG. 2 is a cross-section of the components of FIG. 1 in assembled relationship taken in the direction of the section line 2—2.
FIG. 3 is a perspective view of the retainer lock member component of the coupler of FIG. 2.

Referring now to FIG. 2, further details of the quick coupling device will be evident. As shown, the male connector 14 is partially inserted into the coupler 10. The coupling device itself includes a hollow cylindrical body 17 having a valve seat 18 in the form of a washer of fairly thick axial dimensions. This washer or valve seat defines a reduced diameter opening 18' and a surrounding rearwardly facing annular shoulder 19. A cooperating poppet valve head 20 is slidably positioned in the cylindrical body and a valve spring 21 is positioned between the valve head and inlet end 11 to urge the valve head against the valve seat and thereby normally close off flow of air through the body.

As shown to the left or forward portion of the cylindrical body 17, there are provided side openings 22 circumferentially spaced about the body. These side openings cooperate with a retainer lock member in the form of a ring 23 surrounding the cylindrical body 10 having fingers 24 extending forwardly from circumferentially spaced points on the ring, the fingers then turning radially inwardly to terminate in end portions passing through the side openings 22. The exterior sides of the end portions of each finger include a step 25.

Referring briefly to the perspective view of FIG. 3, the geometry of the retainer lock member made up of the ring 23 and fingers 24 will be evident.

Referring back to FIG. 2, the coupling device is completed by the provision of a retainer spring 26 and surrounding sleeve 27 slidable on the body and surrounding the retainer spring 26. As shown, the sleeve includes an internal circumferential annular shoulder 28 in a position to engage the peripheral forward edge portion of the retainer lock member ring 23.

In FIG. 2, the male connector 14 is shown in the process of being connected to the quick connect device 10. It will be noted that as the male connector is urged in the direction of the arrow 29 of FIG. 2, the nose 15 initially engages the valve head 20 and in this respect, the valve head 20 includes forward extensions 20' which actually are contacted by the nose 15 so that movement into the connector will unseat the valve head from the valve seat 18.

As the valve head is being unseated from the valve seat, the enlarged diameter portion 16 of the male connector engages the inner ends of the fingers 24 of the retainer member and cams them rearwardly and radially outwardly through the side openings 22. In this respect, the retainer member ring portion 23 is free to slide on the cylindrical body 17 against the bias of the retainer spring 26.

Figure 4:
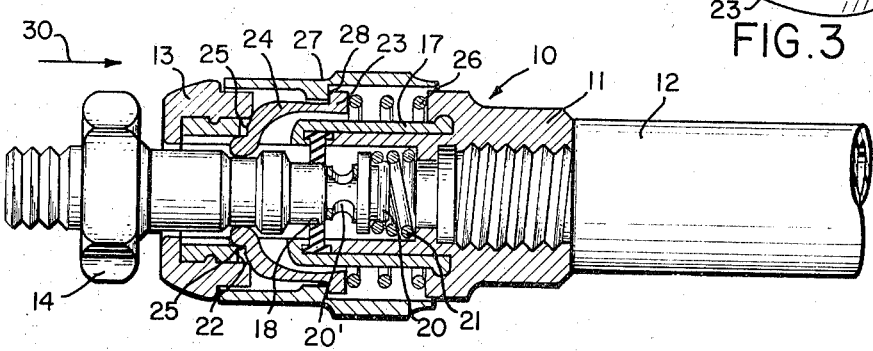
FIG. 4 is a cross-section similar to FIG. 2 but showing the male connector member in fully inserted position; and, FIG. 5 is a view similar to FIG. 4 but showing the manner in which the male connector member is released from the quick coupling device.

Referring to FIG. 4, as the male connector is moved further into the coupler as indicated by the arrow 30 the inner ends of the fingers will snap over the enlarged diameter portion 16 to engage about the rear of the portion, the retainer spring 26 urging the fingers forwardly and their natural radially inwardly directed bias causing them to engage about the nose portion of the connector behind the enlarged diameter portion.

It is to be particularly noted in FIG. 4 that the exterior step 25 on each of the fingers engages under the forward edge of the side opening 22 when the male connector is fully inserted so that radial movement of the fingers is essentially blocked. The male connector is thus thoroughly locked in position.

It should also be noted in FIG. 4 that the nose 15 of the male connector has passed into the valve seat to effect a peripheral seal therewith so that in the connected position shown, air can pass from the air hose 12, about the valve head 20 and between the extensions 20' into the nose of the male connector and ultimately to the air driven tool.

Figure 5:
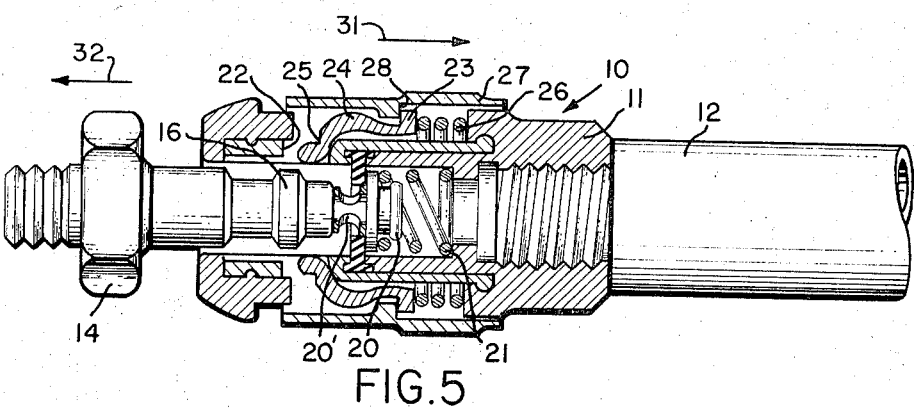

Referring now to FIG. 5, quick disconnecting of the male connector from the device is readily accomplished by sliding the sleeve 27 in a rearward direction as indicated by the arrow 31. This action causes the internal circumferential annular shoulder 28 to engage the ring portion 23 of the retainer member and move it rearwardly thereby pulling on the fingers 25 to unseat them from beneath the forward edge of the side openings 22. The fingers are then in a position to expand radially through the side openings thereby releasing the enlarged diameter portion 16 of the male connector and permitting it to be readily withdrawn as indicated by the arrow 32.

As the male connector is removed, the valve spring 21 will return the valve head on to the valve seat thereby blocking flow of air through the device.

The ability of the coupling device of this invention to accommodate different types and different dimensioned male connectors is in part a consequence of the provision of the valve seat in the form of a fairly thick washer member as measured in an axial direction. This thickness provides an elongated central opening so that if there are variations in the length of the nose portion of the male connector, peripheral sealing with the valve seat can be accomplished over a given distance range. Accommodation of different type connectors is also achieved in part by the design of the retainer member and cooperating fingers. The fingers themselves are flexible and biased radially inwardly and the side openings 22 are of substantially larger dimension than the fingers so that variations in the size of the enlarged diameter portion 16 and its axial length can readily be accommodated.

Finally, the exit end cap 13 as illustrated in FIG. 1 and FIGS. 2, 4 and 5 is arranged to snap on to the outlet end of the cylindrical body 17. This end cap is interchangeable with other end caps defining different sized entrance openings as well as different axial lengths so that the device can be further adjusted to accommodate different types of male connectors wherein the dimensional variation between the enlarged diameter portion and remaining body portions of the connector vary.

As mentioned heretofore, the major components of the coupling device are molded plastic parts so that not only is the expense of manufacture substantially reduced but problems of corrosion and the like are avoided. Moreover, and as also mentioned heretofore, plastic material lends itself well to color coding of such devices.

While the invention has been described with respect to coupling an air hose to an air driven tool, it will be understood, of course, that it is applicable to providing a quick connect and disconnect in any fluid line, liquid or gas. The invention, accordingly, is not to be thought of as limited to the specific environment set forth for illustrative purposes.

What is claimed is:

1. An air hose quick coupling device including:
   a. a cylindrical body having an internal valve seat and poppet valve head spring-biased against said seat;
   b. a retainer member in the form of a ring surrounding the body and a plurality of flexible fingers extending forwardly and biased radially inwardly from circumferentially spaced points on the ring; and,
   c. a retainer spring urging said retainer member forwardly along said body, said body having side openings through which the end portions of the fingers pass, whereby insertion of a male connector having a nose and a central enlarged diameter portion into the coupling device causes the nose to unseat the poppet valve head and peripherally seal against the valve seat and the enlarged diameter portion to snap under the finger ends of the retainer member the end portions of said fingers including a flat step which engages under the forward edge of the opening through which it passes to thereby prevent radial outward movement of each of the fingers when the male member is connected to thereby lock the male connector to the coupling device, the retainer member being manually slidable rearwardly against the bias of the retainer spring to release the fingers and permit removal of the male member.

2. A device according to claim 1, in which said valve seat is in the form of a resilient washer member of substantial axial thickness so that peripheral sealing of different dimensioned nose portions on different types of male connectors is assured.

3. A coupling device for connecting a source of air to an air-driven tool, including, in combination:
   a. a hollow cylindrical body having an inlet end for connection to an air hose from an air source, and an outlet end for connection to a male connector from an air-driven tool, wherein said male connector includes a cylindrical nose portion and enlarged diameter central portion;
   b. said body having a valve seat defining a reduced diameter opening and surrounding annular rearwardly facing shoulder;
   c. a poppet valve head slidably positioned in said cylindrical body;
   d. a valve spring between said head and said inlet end urging said valve head against said valve seat to close off flow of air through said body;
   e. a portion of said outlet end beyond said valve seat including a plurality of circumferentially spaced side openings;
   f. a retainer lock member in the form of a ring surrounding said body and having flexible fingers extending axially forwardly from circumferentially spaced points on the ring, the flexible fingers being biased radially inwardly at their end portions to pass through said side openings, said side openings being larger than the end portions of said fingers the exterior sides of the end portions of each finger including a flat step; and,
   g. a retainer spring surrounding said body in a position to exert a forwarding biasing force on said ring such that the step on each finger underlies the forward edge of a corresponding receiving side opening, whereby insertion of the male connector for said air-driven tool into the outlet end of said body causes the nose portion to engage the poppet valve head and urge it rearwardly from the valve seat against the bias of the valve spring, and the enlarged diameter portion to cam the ends of said fingers rearwardly and outwardly against their resilient bias through the side openings to slide the retainer lock member ring rearwardly along said body against the bias of said retainer spring until the enlarged diameter portion has passed the side openings, said fingers then being moved forwardly by said retainer spring and inwardly as a result of their inward flexible bias to positions in which the flat exterior steps on the finger ends underlie the forward edges of the side openings to thereby lock the male member in said body, the nose of the male member peripherally sealing against the central opening in the valve seat.

4. A coupling device according to claim 3, including a cylindrical sleeve surrounding the retainer spring and slidable longitudinally along said body, said sleeve including an internal circumferential annular shoulder engaging one side of the ring portion of said retainer lock member such that rearward sliding movement of said sleeve will cause the finger ends of the lock member to move rearwardly and disengage from under the front edge of the side openings and pass upwardly through the side openings to release the enlarged diameter portion of the male connector and permit its withdrawal to thereby disconnect the air-driven tool from the coupling device, the valve spring simultaneously returning the poppet valve head against the valve seat to block passage of air.

5. A coupling device according to claim 4, in which said body and retainer lock member are formed of plastic material and the axial extent of the central opening in the valve seat being of a length that peripheral sealing is assured for different length nose portions of male connectors whereby said coupling device can accommodate several different types of male connectors.

6. A coupling device according to claim 5, including an exit end cap means coupled to the outlet end of said body for receiving said male connector, said exit end cap means being interchangeable with different dimensioned exit end cap means so that further accommodation of different types of male connectors is realizable.

* * * * *